US012702951B2

(12) United States Patent
Wölfert et al.

(10) Patent No.: US 12,702,951 B2
(45) Date of Patent: Aug. 11, 2026

(54) PROCESS FOR WORKING-UP A NITROUS OXIDE COMPRISING OFF-GAS STREAM

(71) Applicant: BASF SE, Ludwigshafen am Rhein (DE)

(72) Inventors: Andreas Wölfert, Ludwigshafen am Rhein (DE); Michael Lorenz, Ludwigshafen am Rhein (DE); Gerrit Waters, Ludwigshafen am Rhein (DE); Marcus Reble, Ludwigshafen am Rhein (DE); Holger Friedrich, Ludwigshafen am Rhein (DE); Andreas Weickgenannt, Ludwigshafen am Rhein (DE); Wolfgang Gmeiner, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 503 days.

(21) Appl. No.: 18/271,877

(22) PCT Filed: Jan. 5, 2022

(86) PCT No.: PCT/EP2022/050139
§ 371 (c)(1),
(2) Date: Jul. 12, 2023

(87) PCT Pub. No.: WO2022/152605
PCT Pub. Date: Jul. 21, 2022

(65) Prior Publication Data

US 2024/0216862 A1 Jul. 4, 2024

(30) Foreign Application Priority Data

Jan. 13, 2021 (EP) .................................... 21151410

(51) Int. Cl.
*B01D 53/86* (2006.01)
*B01D 53/34* (2006.01)

(52) U.S. Cl.
CPC ....... *B01D 53/8625* (2013.01); *B01D 53/343* (2013.01); *B01D 53/8696* (2013.01); *B01D 2257/402* (2013.01)

(58) Field of Classification Search
None
See application file for complete search history.

(56) References Cited

U.S. PATENT DOCUMENTS 5,138,180 A 8/1992 Yamanaka
5,200,162 A * 4/1993 Riley ................ B01D 53/8696 423/239.1

(Continued)

FOREIGN PATENT DOCUMENTS

CN 1264066 A 8/2000
CN 104166786 A 11/2014

(Continued)

OTHER PUBLICATIONS

International Search Report and Written Opinion received for PCT Patent Application No. PCT/EP2022/050139, mailed on Mar. 10, 2022, 11 pages.

*Primary Examiner* — Stefanie J Cohen
(74) *Attorney, Agent, or Firm* — Faegre Drinker Biddle & Reath LLP

(57) ABSTRACT

The invention relates on a process for working-up a nitrous oxide comprising off-gas stream from a production process of adipic acid by decomposing the nitrous oxide contained in the off-gas stream into nitrogen and oxygen in a fixed bed reactor (21) of a $N_2O$ decomposition unit (9) at a temperature in the range from 430 to 800° C. to obtain a purified gas, wherein for controlling the $N_2O$ decomposition unit (9) a nonlinear model predictive control is used which is based on (Continued)

a reactor model of the fixed bed reactor based on equations of energy transport and species transport for nitrogen, oxygen and $N_2O$.

11 Claims, 2 Drawing Sheets

(56) References Cited

U.S. PATENT DOCUMENTS

| | | | | |
|---|---|---|---|---|
| 5,758,835 | A | 6/1998 | Annen et al. | |
| 6,122,557 | A | 9/2000 | Harrell et al. | |
| 6,328,941 | B1 * | 12/2001 | Watzenberger | ....... F28D 21/001 423/239.1 |
| 2006/0045800 | A1 | 3/2006 | Boyden et al. | |
| 2006/0058899 | A1 | 3/2006 | Boyden et al. | |
| 2012/0014855 | A1 | 1/2012 | Beran et al. | |
| 2015/0007568 | A1 | 1/2015 | Chaen et al. | |

FOREIGN PATENT DOCUMENTS

| | | | |
|---|---|---|---|
| CN | 106110848 | A | 11/2016 |
| CN | 109985523 | A | 7/2019 |
| DE | 19533715 | A1 | 3/1997 |
| EP | 0413349 | B1 | 11/1994 |
| EP | 0782136 | A1 | 7/1997 |
| EP | 1413349 | B1 | 3/2006 |
| EP | 1782136 | A1 | 5/2007 |
| EP | 1782134 | B1 | 7/2012 |
| EP | 2165756 | B1 | 10/2012 |
| EP | 2387450 | B1 | 3/2014 |
| EP | 2548629 | B1 | 4/2015 |
| EP | 2387451 | B1 | 3/2016 |
| JP | 05-004027 | A | 1/1993 |

* cited by examiner

PROCESS FOR WORKING-UP A NITROUS OXIDE COMPRISING OFF-GAS STREAM

CROSS-REFERENCE TO RELATED APPLICATIONS

This application is a National stage application (under 35 U.S.C. § 371) of PCT/EP2022/050139, filed Jan. 5, 2022, which claims benefit of European Application No. 21151410.4, filed Jan. 13, 2021, both of which are incorporated herein by reference in their entirety.

The invention relates to a process for working-up a nitrous oxide comprising off-gas stream from a production process of adipic acid, the process comprising:

(i) feeding the off-gas stream into a $N_2O$ decomposition unit with a pressure between 5 and 10 bar(abs) and a temperature between 100 and 300° C.;

(ii) heating the off-gas stream to a temperature in the range from 430 to 650° C. in a regenerative heat exchanger and/or a heater;

(iii) decomposing the nitrous oxide contained in the off-gas stream into nitrogen and oxygen in a fixed bed reactor of the $N_2O$ decomposition unit at a temperature in the range from 430 to 800° C. to obtain a purified gas;

(iv) optionally recycling a part of the purified gas into the $N_2O$ decomposition unit.

In the production of adipic acid, nitric acid is added to a mixture of cyclohexanone and cyclohexanol. By the reaction of cyclohexanone and cyclohexanol with nitric acid, a reaction mixture comprising adipic acid and oxides of nitrogen, particularly nitrous oxide, nitrogen monoxide and nitrogen dioxide is obtained. The adipic acid usually is removed from the reaction mixture by crystallization and the oxides of nitrogen are stripped from the reaction mixture by blowing a gas, particularly air, through the reaction mixture. When using air, the nitrogen monoxide reacts with the oxygen contained in the air forming nitrogen dioxide. The thus obtained off-gas stream comprising air, nitrogen dioxide and nitrous oxide is fed into a washing unit, usually a column, in which at least a part of the nitrogen dioxide is washed from the off-gas stream. The nitrogen dioxide may be reused for production of nitric acid which can be used for the production of adipic acid.

The nitrous oxide can be used in other chemical processes, for example in an oxidation reaction for producing cyclododecanone and cyclopentanone. In this case the nitrous oxide can be removed from the off-as by absorption/desorption processes like washing and desorption at different pressures with water.

In order to avoid or at least reduce the nitrous oxide emission, the remaining off-gas stream may be treated thermally or catalytically for decomposing the nitrous oxide, optionally by reduction with methane.

The catalytic decomposition of the nitrous oxide usually is operated at a temperature in the range from 430° C. to 800° C. Depending on the state of the catalyst and the temperature window, the concentration of nitrous oxide of the inlet stream into the decomposition unit which may be in the range from 6 to 20 vol-% may be reduced to a concentration in the outlet stream withdrawn from the decomposition unit in a range from 50 to 3000 vol-ppm.

The temperature of the inlet stream for achieving the required decomposition rate depends inter alia on the inlet concentration and the catalyst age. The inlet temperature thereby usually is in the range from 430° C. to 650° C. with increasing inlet temperature on increasing catalyst age. If the desired concentration in the outlet stream cannot be achieved at a temperature of the inlet stream of 650° C., the catalyst must be changed.

The challenge for decomposition of nitrous oxide from the off-gas from the production of adipic acid is the highly exothermic behavior of this reaction. Each percent of nitrous oxide in the off-gas stream creates an adiabatic temperature increase of 25° C. To prevent catalyst sintering, the temperature in the decomposition unit should remain below 800° C. On the other hand, for achieving the most effective decomposition of the nitrous oxide, the temperature should be as high as possible. A common limit is the design temperature of the inlet section in case of using standard chromium-nickel based steals, which usually is in a range from 550° C. to 650° C.

Avoiding too high temperatures usually is achieved by dilution of the off-gas stream with purified gas, particularly with a recycle flow from the outlet stream. The optimum inlet temperature can be achieved by an optimum degree of heat recovery from the purified gas and/or additional preheating.

In case of changes in the inlet concentration and the inlet volume flow, the values for the recycling flow and for the inlet temperatures have to be adapted. To minimize emissions during this transition state, this should be done as fast as possible. Presently, the values are adapted on basis of the experience of the operators.

Common control strategies fail due to the highly exothermic behavior of the reaction, the highly nonlinear behavior of the decomposition reaction, and the different time scales for concentration and heat propagation process in the catalyst bed. The time scale for concentration propagation processes is in the range from 10 to 20 sec. The time scale for heat propagation processes is in the range from 10 to 20 min.

Small changes in the transition state result in long times with large emissions. Large changes may create temperatures outside the design limits of the decomposition unit. In this case, the decomposition unit must be stopped and restarted, which is undesired with respect to nitrous oxide emissions because the emissions during the start-up are much higher than during load changes. Additionally, the production of the adipic acid must be stopped.

Processes and apparatus for removing nitrous oxide from a gas stream by catalytic decomposition are described for example in EP-B 2 387 451, EP-B 1 413 349, EP-B 2 387 450, EP-B 2 165 756 or EP-B 2 548 629.

Further, for example from EP-B 1 782 134 or EP-A 1 782 136 controllers for directing operation of an air pollution control system are known. For controlling, a model predictive control is used.

The pollutants which are to be removed from the off-gas, particularly are sulfur dioxide and nitrogen oxides, namely nitrogen monoxide and nitrogen dioxide.

It was an object of the present invention to provide a process for working-up a nitrous oxide comprising off-gas stream from a production process of adipic acid in which nitrous oxide emissions can be effectively minimized by catalytically decomposing the nitrous oxide within the temperature limits of a decomposition unit used for reducing the nitrous oxide concentration and the catalyst used in the decomposition unit.

This object is achieved by a process for working-up a nitrous oxide comprising off-gas stream from a production process of adipic acid, the process comprising:

(i) feeding the off-gas stream into a $N_2O$ decomposition unit with a pressure between 5 and 10 bar(abs) and a temperature between 100 and 300° C.;

(ii) heating the off-gas stream to a temperature in the range from 430 to 650° C. in a regenerative heat exchanger and/or a heater;

(iii) decomposing the nitrous oxide contained in the off-gas stream into nitrogen and oxygen in a fixed bed reactor of the $N_2O$ decomposition unit at a temperature in the range from 430 to 800° C. to obtain a purified gas;

(iv) optionally recycling a part of the purified gas into the $N_2O$ decomposition unit;

wherein for controlling the $N_2O$ decomposition unit a nonlinear model predictive control is used which is based on a reactor model of the fixed bed reactor based on equations of energy transport and species transport for nitrogen, oxygen and $N_2O$, the nonlinear model predictive control comprises:

(a) measuring a bed inlet temperature, a bed inlet volume flow, a bed outlet temperature, temperatures along the fixed bed, inlet concentrations of the off-gas stream fed into the $N_2O$ decomposition unit, and outlet concentrations of the purified gas as parameters for the model;

(b) calculating bed activity using an extended Kalman-Filter;

(c) calculating an optimum inlet temperature and optionally a recycle flow as function of time by the nonlinear model predictive control based on the reactor model for a given horizon in time and using calculated values for a given time step of optimum inlet temperature and optimum recycle flow as reference variable for control, wherein (c1) a degree of bypass of the regenerative heat exchanger and/or heating power of the heater and optionally the rotational speed of a recycle blower and/or degree of internal recirculation of the recycle blower are adapted as actors of conventional PID-control of bed inlet temperature and recycle flow, and the nonlinear model predictive control based on the reactor model proposes only the optimum inlet temperature and optionally recycle flow;

or (c2) calculating an optimum degree of bypass of the regenerative heat exchanger and/or heating power of the heater and optionally the rotational speed of the recycle blower and/or degree of internal recirculation of the recycle blower as function of time by using the reactor model for given horizon in time and adapting the degree of bypass of the regenerative heat exchanger and/or heating power and optionally the rotational speed of the recycle blower and/or degree of internal recirculation of the recycle blower as direct actors of the nonlinear model predictive control based on the reactor model;

(d) shifting horizon in time with a given time step;

(e) repeating steps (a) to (d).

By the inventive process using the nonlinear model predictive control it is possible despite the different time scales for concentration and heat propagation process to adjust the inlet temperature of the off-gas stream entering the decomposition unit and the amount of the recycle flow to minimize the nitrous oxide emissions and further to operate the process at optimum conditions with keeping the maximum temperature below the temperature at which sintering of the catalyst starts.

Nonlinear model predicted control as used in this invention is known to a skilled person and is described e.g. in L. Magni, D. M. Raimondo, F. Allgöwer, Nonlinear Model Predictive Control Towards New Challenging Applications, Springer Berlin Heidelberg, 2009.

Surprisingly it was found that despite the high exothermic behavior of the reaction, the highly nonlinear behavior of the decomposition reaction and the strongly different time scales for concentration and heat propagation processes in the catalyst bed, the inventive control allows operating the process such that the amount of nitrous oxide in the purified gas can be kept in the order of 100 ppm or less.

In the context of the present invention, the term “oxides of nitrogen” means all oxides of nitrogen, including nitrous oxide and the so-called $NO_x$, particularly nitrogen monoxide and nitrogen dioxide. The term “nitrogen oxides” on the other hand does not include the nitrous oxide but only means $NO_x$, particularly nitrogen monoxide and nitrogen dioxide.

Before feeding the nitrous oxide comprising off-gas stream into the $N_2O$ decomposition unit, it is preferred that nitrogen oxides are absorbed from the off-gas stream in water by pressure absorption. For absorbing the nitrogen oxides in water, preferably an absorption column is used. The absorption column may be operated in counter current or co-current, preferably in counter current. For this purpose, the off-gas stream is fed into the absorption column at one end, preferably at the bottom and the water is fed at the other end, preferably the top of the absorption column. Inside the absorption column nitrogen dioxide is absorbed in water by formation of nitric acid and nitrogen monoxide. The nitrogen monoxide reacts with the oxygen in the off-gas stream by formation of nitrogen dioxide, which again is absorbed in water by the formation of nitric acid and nitrogen monoxide. This process repeats along the whole column so that at the exit of the column the amounts of nitrogen dioxide as well as nitrogen monoxide are reduced in the off-gas stream. After absorbing the nitrogen oxides by this mechanism, the nitric acid comprising water is removed from the absorption column at the bottom. The absorption column preferably comprises 10 to 80 stages, more preferred 20 to 70 stages and particularly 40 to 60 stages. The temperature at which the absorption is carried out preferably is in a range from 5 to 70° C., more preferred in a range from 10 to 60° C. and particularly in a range from 20 to 50° C.

The absorption column preferably comprises internals. Suitable internals for example are packings like a packed bed or a structured packing. Further, the absorption column may comprise trays as internals. Particularly preferably, the internals in the absorption column are water-cooled trays.

The nitrous oxide comprising off gas stream preferably is fed to the absorption column together with an additional gas mixture from ammonia combustion, comprising mainly nitrogen monoxide and nitrogen dioxide, water, oxygen, nitrogen, argon and carbon dioxide.

Additionally or alternatively, besides feeding the nitrous oxide comprising off gas stream optionally together with an additional gas mixture from ammonia combustion to the absorption column, it is preferred that nitrogen monoxide contained in the off-gas stream is oxidized to nitrogen dioxide before feeding the off-gas stream into the absorption column. For oxidizing the nitrogen monoxide, it is preferred to compress the off-gas stream to a pressure in a range from 1.2 to 3 bar(abs), more preferred in a range from 1.3 to 2.7 bar(abs) and particularly in a range from 1.5 to 2.5 bar(abs). In a following step or simultaneously, the off-gas stream is cooled to a temperature in a range from 20 to 50° C., more preferred in a range from 25 to 45° C. and particularly in a range from 30 to 40° C. After cooling, the off-gas stream is compressed in a second step to a pressure in a range from 3 to 12 bar(abs), more preferred in a range from 4 to 11 bar(abs) and particularly in a range from 5 to 10 bar(abs).

The thus compressed off-gas stream and additional air are passed through a residence-time reactor, wherein the ratio of the normalized volume flows of the compressed off-gas stream and additional air preferably is in a range from 1.5 to 3.5, more preferred in a range from 1.6 to 2.9 and particularly in a range from 1.8 to 2.5. The temperature inlet temperature of the off-gas stream into the residence-time reactor preferably is in a range from 120 to 300° C., more preferred in a range from 150 to 275° C. and particularly in a range from 220 to 250° C., the outlet temperature of the off-gas stream leaving the residence-time reactor preferably is in a range from 250 to 360° C., more preferred in a range from 270 to 350° C. and particularly in a range from 280 to 340° C. The residence time of the off-gas stream in the residence-time reactor preferably is in a range from 10 to 60 see, more preferred in a range from 15 to 50 see and particularly in a range from 20 to 30 sec.

After passing the residence-time reactor, the off-gas stream is cooled to a temperature in the range from 10 to 50° C., more preferred in a range from 20 to 40° C. and particularly in a range from 30 to 35° C.

After carrying out the pressure absorption for removing nitrous oxide and/or the oxidization reaction of nitrogen monoxide, the off-gas stream is fed partially or completely into an $N_2O$ isolation in which nitrous oxide from at least a part of the off-gas stream is concentrated by a two-stage absorption/desorption process with water.

In the first stage of the two-stage absorption/desorption process, $N_2O$ is absorbed in water in a first absorption column. The first absorption column is operated at a pressure in a range from 15 to 30 bar(abs), more preferred in a range from 17 to 28 bar(abs) and particularly in a range from 19 to 26 bar(abs) and a temperature in a range from 10 to 45° C., more preferred in a range from 20 to 42° C. and particularly in a range from 30 to 35° C. Following the first absorption stage, the nitrous oxide is desorbed from the water in a first desorber which runs at a pressure in a range from 1 to 1.5 bar(abs), more preferred in a range from 1.05 to 1.3 bar(abs) and particularly in a range from 1.1 to 1.2 bar(abs) and a temperature in a range from 10 to 45° C., more preferred in a range from 20 to 42° C. and particularly from 30 to 35° C. After being desorbed from the water, the resulting gas stream is fed into a second absorption column which runs at a pressure in a range from 15 to 30 bar(abs), more preferred in a range from 17 to 25 bar(abs) and particularly in a range from 19 to 23 bar(abs) and a temperature in a range from 10 to 45° C., more preferred in a range from 15 to 30° C. and particularly in a range from 20 to 35° C. In a second desorber which is operated at a pressure in a range from 1 to 1.5 bar(abs), more preferred in a range from 1.05 to 1.3 bar(abs) and particularly in a range from 1.1 to 1.2 bar(abs) concentrated nitrous oxide is obtained which preferably is fed into a process for producing cyclododecanone and cyclopentanone.

Only a part of the nitrous oxide in the off-gas stream from the pressure absorption and/or oxidation of nitrogen monoxide is absorbed in the two-stage absorption/desorption process. The remaining part preferably is split for being recycled into the off-gas stream comprising the mixture of the off-gas from adipic acid production and optionally off-gas from ammonia combustion, before carrying out the oxidation reaction of nitrogen monoxide and for being fed to the decomposition process of nitrous oxide.

Even though in the two stage absorption/desorption process a large part of the nitrogen oxide is removed from the off-gas stream, the off-gas stream withdrawn from the two stage absorption/desorption process still contains 5 to 18 vol % nitrous oxide. As nitrous oxide has green-house-gas factor of about 300, it is necessary to remove the nitrous oxide from the off-gas stream.

For removing the nitrous oxide from the off-gas stream, the off-gas stream is heated to a temperature in a range from 100 to 300° C., more preferred in a range from 170 to 270° C. and particularly in a range from 210 to 260° C. and then fed into the $N_2O$ decomposition unit in (i). The pressure with which the off-gas stream is fed into the $N_2O$ decomposition unit is in a range from 5 to 10 bar(abs), more preferred in a range from 6 to 9.5 bar(abs) and particularly in a range from 7 to 9 bar(abs).

Preferably, the off-gas stream is heated in a tube bundle heat exchanger, a u-tube bundle heat exchanger or a spiral heat exchanger. Preferably, a tube bundle heat exchanger is used for heating. As heating medium, preferably, the hot off-gas withdrawn from the residence time reactor is used.

Independently of whether the oxidation of nitrogen monoxide, the pressure absorption and/or the two stage absorption/desorption process have been carried out, it is preferred if the off-gas stream fed into the $N_2O$ decomposition unit contains 3 to 25 vol-% nitrous oxide, more preferred 4 to 18 vol-% nitrous oxide and particularly 6 to 13 vol-% nitrous oxide. Further, the off-gas stream fed into the $N_2O$ decomposition unit may comprise 1 to 12 vol-% oxygen, 0.5 to 5 vol-% carbon dioxide, 0 to 0.3 vol-% carbon monoxide, 0.2 to 0.8 vol-% noble gases, particularly argon, 0.1 to 2 vol-% water, and 200 to 5000 vol-ppm nitrogen oxides, more preferred 1.5 to 6 vol-% oxygen, 0.7 to 3.5 vol-% carbon dioxide, 0 to 0.25 vol-% carbon monoxide, 0.3 to 0.6 vol-% noble gases, particularly argon, more preferred 0.2 to 1.3 vol-% water and 300 to 3000 vol-ppm nitrogen oxides and particularly 2 to 4 vol-% oxygen, 1 to 2 vol-% carbon dioxide, 0 to 0.2 vol-% carbon monoxide, 0.2 to 0.5 vol-% noble gases, particularly argon, 0.3 to 1 vol-% water, and 500 to 1000 vol-ppm nitrogen oxides.

The main component in the off-gas stream is nitrogen which is comprised in an amount from 55 to 95 vol-%, more preferred from 70 to 92 vol-% and particularly from 80 to 90 vol-%. Besides these components, the off-gas stream may contain further impurities which usually are in amount below 2 vol-%, more preferred below 1 vol-% and particularly below 0.5 vol-%.

The inventive process for working up the nitrous oxide comprising off-gas stream particularly is suitable for industrial scale processes. Therefore, the volume flow fed into the $N_2O$ decomposition unit may be in a range from 5000 to 70000 $Nm^3/h$, more preferred in a range from 7000 to 60000 $Nm^3/h$ and particularly in a range from 10000 to 50000 $Nm^3/h$. However, besides working up nitrous oxide comprising off-gas in an industrial scale, it is also possible to use the process in a process where smaller amounts of nitrous oxide off-gas occur, for example in a pilot plant or in a laboratory. However, particularly preferably, the process is used in industrial scale.

The catalyst loading of the nitrous oxide comprising volume flow in normalized cubic meters per hour and per kg catalyst on the fixed bed is in the range from 0.5 to 10 $Nm^3/h/kg$ catalyst, more preferred in a range from 1.5 to 6.5 $Nm^3/h/kg$ catalyst and particularly in a range from 2 to 4 $Nm^3/h/kg$ catalyst.

The $N_2O$ decomposition unit preferably comprises a regenerative heat exchanger in which the nitrous oxide comprising off-gas stream is preheated. The regenerative heat exchanger particularly preferably is a regenerative heat exchanger in which the off-gas stream fed into the $N_2O$ decomposition unit is heated by heat transfer from the gas leaving the $N_2O$ decomposition unit. This has the additional positive effect that the purified gas being withdrawn from the $N_2O$ decomposition unit is cooled and that energy consumption for heating and cooling can be reduced. The regenerative heat exchanger can be any heat exchanger which is suitable for transferring heat from one gas stream to another gas stream by indirect heat transfer. Suitable heat exchangers for example are u-tube bundle heat exchangers, tube bundle heat exchanger or spiral heat exchangers. Preferred is a tube bundle heat exchanger.

If the heat transfer in the regenerative heat exchanger is not sufficient to heat the off-gas stream to a predefined temperature with which the off-gas stream is fed into the fixed bed reactor, it is preferred to provide an additional heater. Alternatively, it is also possible to only use a heater and to omit the regenerative heat exchanger. However, for reasons of energy saving, it is preferred to heat the off-gas stream in a regenerative heat exchanger and provide the additional heater to have the opportunity for further heating the off-gas stream to the predefined temperature if heating in the regenerative heat exchanger is not sufficient. The additional heater, if a regenerative heat exchanger is comprised, or the heater, if no regenerative heat exchanger is used, preferably is an electrical heater. However, besides an electrical heater, also a direct or indirect gas fired heater can be used as additional heater or heater. Direct gas fired heater means that the off gas of the gas fired heater is added to the nitrous oxide comprising off-gas stream. Indirect gas fired heater means that the heating the off-gas of the gas fired heater is transferred to the nitrous oxide comprising off-gas stream by an additional heat exchanger. Among the gas fired heaters a direct gas fired heater is preferred.

The predefined temperature to which the off-gas stream is heated before feeding the off-gas stream into the fixed bed reactor is in a range from 430 to 650° C., more preferred in a range from 450 to 550° C. and particularly in a range from 480 to 520° C.

The thus heated off-gas stream is then fed into the fixed bed reactor for decomposing the nitrous oxide into nitrogen and oxygen. The fixed bed contains a suitable catalyst for the decomposition of the nitrous oxide. Thereby, any catalyst suitable for the decomposition reaction can be used. Suitable catalysts particularly are catalysts based on copper oxide and zinc oxide as catalytic material. Particularly preferably, the catalyst comprises a mixture of 14 to 18 wt-% copper oxide and less than 20 wt % zinc oxide as catalytic active material on aluminum oxide and/or magnesium oxide as support material. The catalyst preferably is provided as extrudates with a length of 2 mm to 2 cm, preferably of 4 mm to 1 cm and with a diameter of 2 mm to 10 mm, preferably of 4 to 8 mm. The cross sectional shape of the catalyst preferably is a circular disc or a star, preferably a star.

The reaction in the fixed bed reactor is carried out at a temperature in a range from 430 to 800° C., more preferred in a range from 450 to 750° C. and particularly in a range from 520 to 700° C.

Due to aging of the catalyst and the partial deactivation of the catalyst as a result of the aging, it is necessary to increase the temperature for carrying out the decomposition reaction with increasing age of the catalyst. However, to avoid sintering of the catalyst, the temperature in the fixed bed reactor should not exceed 800° C. This is achieved by the nonlinear model predictive control according to the invention.

If the $N_2O$ decomposition unit comprises a regenerative heat exchanger, the purified gas withdrawn from the fixed bed reactor is fed into the regenerative heat exchanger and cooled by heat transfer to the off-gas stream fed into the $N_2O$ decomposition unit.

Independently whether a regenerative heat exchanger is comprised, it is preferred to further cool the purified gas withdrawn from the fixed bed reactor. Cooling preferably is carried out by heat transfer in at least one heat exchanger in which heat is transferred to a cooling medium, particularly water. Particularly preferably, in at least one heat exchanger the water is evaporated and/or superheated by the indirect heat transfer from the purified gas withdrawn from the fixed bed reactor. Suitable heat exchangers for cooling the purified gas for example are tube bundle heat exchangers, u-tube bundle heat exchangers, or spiral heat exchangers or coils in the pathway of the off-gas.

For achieving a sufficient low concentration of nitrous oxide in the purified gas withdrawn from the fixed bed reactor, the concentration of nitrous oxide in the off-gas stream which is fed into the $N_2O$ decomposition unit and particularly which is fed into the fixed bed reactor should be below 13 vol-%, more preferred below 12 vol.-% and particularly below 11 vol-%. If the concentration of nitrous oxide in the off-gas stream is above these values, preferably a part of the purified gas withdrawn from the decomposition reactor is recycled into the $N_2O$ decomposition unit as recycle stream. The amount of the recycle stream is set such that the amount of $N_2O$ in the gas stream being fed into the fixed bed reactor remains below these concentration values.

The recycle stream is established by a recycle blower. The amount of recycled purified gas depends on the rotational speed of the recycle blower and/or on the internal recirculation rate of the recycle blower. By changing the degree of internal recirculation between the pressure and inlet side of the recycle blower the effective recycle stream can be changed without changing the rotational speed of the recycle blower.

For removing remaining nitrogen oxides from the purified gas, it is preferred to pass the purified gas withdrawn from the $N_2O$ decomposition unit through a denitrification plant, a so called DeNox unit, in which the nitrogen oxides are reduced. The DeNox unit may be any DeNox unit known to a skilled person. Usually reduction of the nitrogen oxides is carried out in the presence of a solid catalyst by adding urea or ammonia.

Due to the high pressure of the gas stream which is passed through the $N_2O$ decomposition unit and optionally through the DeNox unit, it is preferred to pass the gas stream through an expansion turbine before releasing the gas into the atmosphere. By passing the gas stream through an expansion turbine, the pressure can be used for producing electric current or for example for driving a compressor or any other apparatus having rotating parts which shall be driven.

For optimizing the process and keeping the concentration of nitrous oxide in the purified gas which is withdrawn from the $N_2O$ decomposition unit, the process is controlled by the nonlinear model predictive control.

The nonlinear model predictive control is based on a reactor model of the fixed bed based on the equations of energy transport and species transport for nitrogen, oxygen and nitrous oxide.

The reactor model particularly is based on equations of species transport for $N_2$, $O_2$ and $N_2O$:

$$\varepsilon_0 \cdot \rho \frac{\partial g_i}{\partial t} = -G_z \frac{\partial g_i}{\partial z} + D \cdot \rho \frac{\partial^2 g_i}{\partial z^2} + \rho_s M_i v_i w$$

with the boundary conditions $$D\rho \frac{\partial g_i}{\partial z}\bigg|_{z=0} = +G_z\left(g_i|_{z=0} - g_i^0\right)$$

$$\frac{\partial g_i}{\partial z}\bigg|_{z=l} = 0$$

and on equations of energy transport:

$$(\varepsilon_S \cdot \rho \cdot c_p + \rho_s \cdot c_{ps}) \frac{\partial T}{\partial t} = +G_z \cdot c_p \frac{\partial T}{\partial z} + \lambda_{ax} \frac{\partial^2 T}{\partial z^2} + \rho_s \cdot (-\Delta H_R) \cdot w$$

with the boundary conditions $$\lambda_{ax} \frac{\partial T}{\partial z}\bigg|_{z=0} = +G_z \cdot c_p\left(T|_{z=0} - T^0\right)$$

$$\frac{\partial T}{\partial z}\bigg|_{z=l} = 0$$

In the equations:

$\varepsilon_s$ means the void fraction of the fixed bed $\rho$ is the density of the gas stream $\rho_s$ is the bulk density of the fixed bed $g_i$ is the mass fraction of component i $$g_i^0$$

is the mass fraction of component i in the feed t means the time z means the longitudinal expansion of the fluidized bed in direction of flow of the gas stream z=0 is the position where the gas enters the fixed bed z=l is the position where the gas leaves the fixed bed $G_z$ means the cross sectional load D is the dispersion coefficient $M_i$ means molar weight of component i $v_i$ is the stoichiometric factor $c_p$ is the specific heat capacity of the gas stream $c_{ps}$ is the specific heat capacity of the solids of the fixed bed T is the temperature in [K]

$T^0$ is the temperature of the gas stream fed into the reactor $\lambda_{ax}$ means the heat conductivity in axial direction in the fixed bed $\Delta H_R$ is the reaction enthalpy and $w=k(T)\cdot p_{N_2O}\cdot\eta\cdot akt(z)$ wherein k(T) is a temperature-dependent velocity constant $p_{N_2O}$ is the partial pressure of nitrous oxide $\eta$ means pore utilization akt(z) means the catalyst activity in the direction of the main gas flow.

In a first step (a) the energy transport and species transport, bed inlet temperature, bed inlet volume flow, bed outlet temperature, temperatures along the bed, concentration of the off-gas stream fed into the $N_2O$ decomposition unit and outlet concentration of the purified gas are measured and used as parameters for the model.

In the equations of energy transport and species transport used in the model, all material properties are based on given constants in time and along the axis of the fixed bed reactor in direction of the main gas flow. The activity of the catalyst along the direction of the main gas flow is calculated in step (b) by an observer using extended Kalman-filter. Along the direction perpendicular to the main gas flow, catalyst activity is assumed as being constant. Further the activity of the catalyst also is assumed as being constant during one time step of the model. In flow direction it is preferred to divide the bed in 1 to 10 sections, preferably 1 to 7 and assume that the activity of the catalyst is constant in each section. Alternatively, it is also possible to calculate a profile of catalyst activity along the flow direction of the gas.

For solving the equations of the model, any numeric process can be used, for example finite difference method, finite element method or finite volume method. Particularly preferably, the finite volume method is used.

By using the nonlinear model predictive control based on the reactor model, the optimum inlet temperature and recycle flow are calculated as a function of time for a given horizon in time. The thus calculated values are used for a given time step of optimum inlet temperature and optimum recycle flow as reference variable for control. The given time horizon for prediction preferably is in a range from 10 to 90 min, more preferred in a range from 20 to 75 min, and particularly in a range from 30 to 60 min. The given time step for updating the calculations and providing a new set of values for the optimum inlet temperature and recycle flow preferably is in a range from 5 to 30 see, more preferred in a range from 7 to 25 see and particularly in a range from 10 to 20 sec. This means that by the nonlinear model predictive control the controlled values are optimized for the time horizon into the future and this optimization is repeated with each time step with a shifted time horizon and based on new initial conditions.

In one embodiment, in step (c1), for setting the recycle stream and/or the inlet temperature into the fixed bed reactor, the degree of bypass of the regenerative heat exchanger and/or electrical heating power and the rotational speed of the recycle blower and/or degree of internal recirculation of the recycle blower are adapted as actors of conventional PID-control of inlet temperature and inlet flow into the fixed bed reactor, and the nonlinear model predictive control proposes only the optimum inlet temperature and the optimum recycle flow.

In a second embodiment, in step (c2) the optimum degree of by-pass of the regenerative heat exchanger, if a regenerative heat exchanger is used, and/or heating power for the additional heater as well as the rotational speed of the recycle blower and/or degree of internal recirculation of the recycle blower are calculated as a function of time by using the reactor model for a given horizon in time and the bypass of the regenerative heat exchanger and/or the heating power and the rotational speed of the recycle blower and/or degree of internal recirculation of the recycle blower are adapted as direct actors of the nonlinear model predictive control.

After reaching the end point of a time step, the time horizon is shifted with the given time step in step (d). After shifting the time horizon, steps (a) to (d) are repeated.

The nonlinear model predictive control has the target for optimization that a time-integrated $N_2O$-emission rate during prediction horizon is minimized. This means that the total $N_2O$-emission during prediction horizon is minimized. A further target for optimization is that within the prediction horizon the $N_2O$-outlet concentration is as close as possible equal to a set-point of the control. Here, "as close as possible" can be defined as, but is not limited to, minimizing the time integrated squared difference between set-point and process value of $N_2O$-outlet concentration. A further preferred target is that this set-point is below 800 ppm, more preferred below 500 ppm, mostly preferred below 100 ppm, and particularly 0 ppm.

Restrictions in the nonlinear model predictive control of the reactor are that the value for the recycle flow (iv) is larger than 0 and smaller than a maximum capacity of the recycle blower, that the gas inlet temperature into the fixed bed reactor is smaller than a set-point of safety circuit minus an offset and that the bed temperature and the bed outlet temperature are smaller than the set-point of safety circuit minus an offset and the bed temperature and the bed outlet temperature are smaller than the start temperature of catalyst sintering and deactivation. Therein, the set-points of the safety circuits result from design limits of the $N_2O$ decomposition unit.

The selected offset between maximum bed temperature to the start temperature of catalyst sintering and deactivation or between maximum gas inlet temperature or bed temperature or bed outlet temperature to the set-point of safety circuits is selected to be between 100 and 3 K, preferably between 50 and 3 K, more preferably between 30 and 3 K and particularly between 20 and 3 K.

Illustrative embodiments of the invention are shown in the figures and explained in more detail in the following description.

Figure 1:
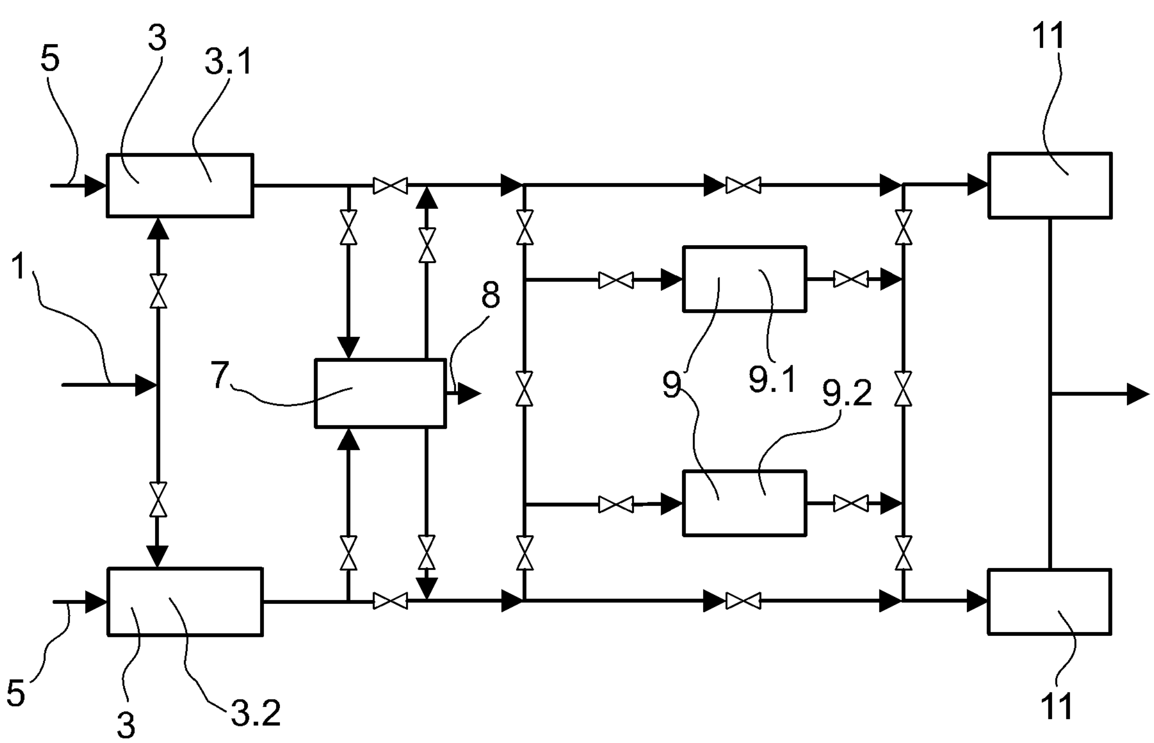
FIG. 1 shows schematically a process for working-up a nitrous oxide comprising off-gas stream.

A process for working-up a nitrous oxide comprising off-gas stream from a production process of adipic acid is shown schematically in FIG. 1.

For working-up, a nitrous oxide comprising off-gas stream 1 is fed into a pressure absorption 3 for removing nitrogen oxides. To allow continuous operation in case of failures of a pressure absorption unit, the process comprises a first pressure absorption 3.1 and a second pressure absorption 3.2 for removing nitrogen oxides. This enables to continue the process by using one of the pressure absorptions 3.1, 3.2 for removing nitrogen oxides if the other pressure absorption 3.2, 3.1 is shut down, for example for maintenance purposes. Further, it is also possible to use both pressure absorptions 3.1, 3.2 for removing nitrogen oxides simultaneously.

In each pressure absorption 3 for removing nitrogen oxides, the nitrous oxide comprising off-gas stream 1 is compressed and cooled and passes a residence time in which nitrogen monoxide is converted into nitrogen dioxide. Subsequently, the gas stream is fed into an absorption column which comprises cooled trays, particularly trays which comprise cooling coils through which water flows. In the absorption column, a part of the nitrogen dioxide reacts with water forming nitric acid. This process preferably corresponds to a standard process for producing nitric acid.

Additionally, the off-gas of combustion of ammonia 5 also may be introduced into the pressure absorption 3. If off-gas of the combustion of ammonia 5 is fed into the pressure absorption 3, it is particularly preferred that the nitrous oxide comprising gas stream 1 from the production process of adipic acid and the off-gas of the combustion of ammonia 5 are mixed before the gas stream is compressed.

The off-gas of the pressure absorption 3 is fed into an absorption/desorption process 7 in which nitrous oxide in the gas stream is removed partially by absorption in water and subsequent desorption processes, where a first absorption and desorption process is followed by at least one more absorption and desorption process. The absorption and desorption processes thereby are carried out at different pressures. The nitrous oxide 8 separated off and concentrated in the absorption/desorption process preferably is used in the production of cyclododecanone or cylcopentanone. However, the nitrous oxide also may be used in any other process which uses nitrous oxide.

Since the gas stream which is fed into the absorption/desorption process 7 particularly contains the residual nitrous oxide besides traces of nitrogen dioxide, after leaving the absorption/desorption process 7, the gas stream is fed into a $N_2O$ decomposition unit 9. To allow continuous operation, it is preferred to provide a first $N_2O$ decomposition unit 9.1 and a second $N_2O$ decomposition unit 9.2. During normal operation, one of the $N_2O$ decomposition units 9.1, 9.2 runs and the second $N_2O$ decomposition unit 9.2, 9.1 is in stand-by mode and can be used as redundancy in case of maintenance of one $N_2O$ decomposition unit for example during catalyst change. Further, the $N_2O$ decomposition unit which is in stand-by can be used in case of a failure of the $N_2O$ decomposition unit which is in operation.

In the $N_2O$ decomposition unit 9.1, 9.2, the nitrous oxide is decomposed into nitrogen and oxygen.

The gas stream leaving the $N_2O$ decomposition unit 9.1, 9.2 may still contain nitrogen oxides. Therefore, it is particularly preferred, as shown in FIG. 1, to feed the gas stream after leaving the $N_2O$ decomposition unit 9.1, 9.2 into a DeNox unit 11 for reducing the amount of nitrogen oxides. After passing the DeNox unit 11, the gas stream is expanded and released into the atmosphere.

Figure 2:
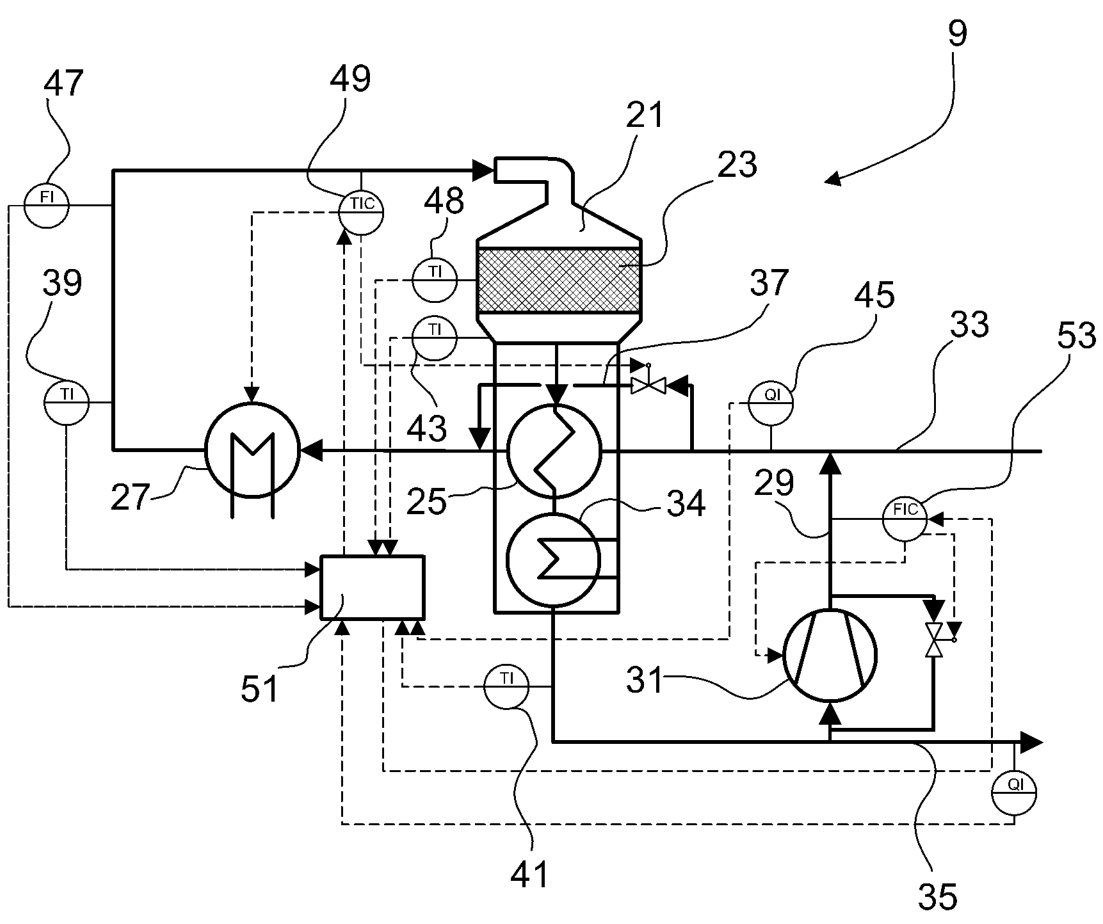
FIG. 2 shows a $N_2O$ decomposition unit.

A $N_2O$ decomposition unit is shown in FIG. 2.

Decomposition of nitrous oxide into nitrogen and oxygen is carried out at elevated temperatures, particularly at a temperature in the range between 430 to 800° C. in a reactor 21 in presence of a catalyst. The reactor 21 may be for example a fixed bed reactor as shown in FIG. 2. The fixed bed 23 contains a heterogeneous catalyst which promotes the decomposition reaction of nitrous oxide into nitrogen and oxygen. The decomposition reaction of nitrous oxide is exothermal.

For heating the gas stream containing the nitrous oxide, the gas stream preferably is fed into a regenerative heat exchanger 25 in which heat is transferred from the gas stream leaving the reactor 21 to the gas stream entering the $N_2O$ decomposition unit 9. By this internal heat transfer it is possible to reduce the energy which must be supplied to the process.

As generally heating of the gas stream being fed into the $N_2O$ decomposition unit 9, after leaving the regenerative heat exchanger 25, the gas stream is fed into a heater 27. The heater may be any type of heater in which the gas can be heated to the temperature with which the gas stream is fed into the reactor 21. Particularly preferably, the heater 27 is an electrical heater.

In the fixed bed 23 in the reactor 21, the nitrous oxide is decomposed forming oxygen and nitrogen. The gas stream obtained by the reaction then is fed into the regenerative heat exchanger 25 for heating the gas stream fed into the $N_2O$ decomposition unit 9. By this heat transfer simultaneously the off-gas withdrawn from the $N_2O$ decomposition unit 9 is cooled. The off-gas withdrawn from the regenerative heat exchanger 25 may be further cooled in at least one additional heat exchanger 34. The additional heat exchanger 34 preferably is a heat exchanger for producing steam by evaporation of water or for superheating water. The off-gas withdrawn from the additional heat exchanger 34 can be fed into the DeNox unit 11 or released into the atmosphere. If multiple additional heat exchangers are used, the off-gas is first cooled in a heat exchanger, where saturated steam is superheated and is then cooled in a further heat exchanger where water is evaporated.

For a largely complete or particularly a complete decomposition of the nitrous oxide it is necessary to keep the amount of nitrous oxide in the gas stream fed into the reactor 21 below a predefined upper range, particularly below 11 wt-%. For reducing the amount of nitrous oxide in the gas stream fed into the reactor if this gas stream contains too much nitrous oxide, a recycle line 29 with a recycle blower 31 is provided, the recycle line 29 connecting a feed line 33 by which the gas stream is fed into the $N_2O$ decomposition unit 9 and an exit line 35 by which the gas is withdrawn from the $N_2O$ decomposition unit 9.

For controlling the $N_2O$ decomposition unit 9 using the nonlinear model predictive control, several process data must be measured. Further it is necessary to control the compressor 31 to set the amount of gas recycled into the gas stream fed into the $N_2O$ decomposition unit 9 and to control the heater 27 to heat the gas stream fed into the reactor to a predefined temperature. Further, for setting the temperature of the gas stream fed into the reactor 21 a bypass 37 may be provided, bypassing the regenerative heat exchanger 25. The bypass 37 may be closed so that the whole gas stream flows through the regenerative heat exchanger 25 or the bypass 37 is open and the feed line into the regenerative heat exchanger 25 is closed so that the whole gas stream flows through the bypass 37 or in a third alternative, the gas stream is split and a part flows through the regenerative heat exchanger 25 and a part through the bypass 37.

For providing the data used for the nonlinear model predictive control, a first temperature indicator 39 is provided for measuring the temperature of the gas stream after being heated in the heater 27 and a second temperature indicator 41 for measuring the temperature of the gas stream being withdrawn from the reactor 21 after having passed the regenerative heat exchanger 25 and the at least one additional heat exchanger 34. By using a third temperature indicator 43 the temperature in the reactor 21 after the fixed bed 23 is measured. Further, the concentration of nitrous oxide in the gas stream is measured by a suitable quality indicator 45 and the flow rate of the gas stream fed into the reactor 21 by a flowmeter 47. A fourth temperature indicator 48 is used for measuring the temperature in the fixed bed 23 and by using a second quality indicator 50, the concentration of the nitrous oxide in the off-gas which flows through the exit line 35 is measured.

Temperature measuring in the fixed bed is done with at least one temperature indicator 48. As usually the temperature along the flow direction of the gas is not constant, it is preferred that 2 to 12 temperature indicators, and more preferably 3 to 10 temperature indicators which are arranged in succession in flow direction of the gas are used for measuring the temperature in the fixed bed 23.

By the nonlinear model predictive control, an optimum inlet temperature is calculated which is submitted to a temperature controller 49, which sets the amount of the gas stream flowing through the bypass 37 and/or for the power of the heater 27 to control the temperature of the gas fed into the reactor 21. Further, the nonlinear model predictive control may submit an optimum value of the amount of the gas stream which is recycled through the recycle line 29 to the flow controller 53, which sets the rotational speed and/or degree of internal recirculation of the recycle blower 31 to control the gas stream which is recycled through the recycle line 29.

The data which are used for the nonlinear model predictive control are submitted to a data processing unit 51.

In the data processing unit which can be any data processing unit known to a skilled person, particularly a computer the activity of the fixed bed 23 is calculated using an extended Kalman-Filter. Further, an optimum inlet temperature and a recycle flow are calculated by nonlinear model predictive control as a function of time by using a reactor model of the fixed bed reactor which is based on equations of energy transport and species transport for nitrogen, oxygen and nitrous oxide for a given horizon in time. The calculated values for a given time step of optimum inlet temperature and optimum recycle flow are used as reference variables for controlling the temperature by temperature controller 49 and the recycle stream which is recycled into the stream being fed into the $N_2O$ decomposition unit 9 via bypass 29 using a flow controller 53.

The nonlinear model predictive control based on the reactor model is adapted such that either a degree of bypass of the regenerative heat exchanger and/or heating power of the heater and optionally the rotational speed of the recycle blower and/or degree of internal recirculation of the recycle blower are adapted as actors of conventional PID-control of inlet temperature of the fixed bed and optionally of the amount of the recycle flow, and the nonlinear model predictive control proposes only the optimum inlet temperature and recycle flow; or an optimum degree of bypass of the regenerative heat exchanger and/or heating power of the heater and optionally the rotational speed of the recycle blower and/or degree of internal recirculation of the recycle blower as function of time is calculated by using the nonlinear model predictive control algorithm which is based on the reactor model for given horizon in time and the degree of bypass of the regenerative heat exchanger and/or heating power and optionally the rotational speed of the recycle blower and/or degree of internal recirculation of the recycle blower is adapted as direct actors of the nonlinear model predictive control.

After having calculated the optimum inlet temperature and optimum recycle flow for a given horizon in time, the horizon in time is shifted with a given time step and subsequently, all measurements and calculations are repeated for the new horizon in time.

The invention claimed is:

1. A process for working-up a nitrous oxide comprising off-gas stream from a production process of adipic acid, the process comprising:

(i) feeding the off-gas stream into a $N_2O$ decomposition unit with a pressure between 5 and 10 bar(abs) and a temperature between 10° and 300° C.;

(ii) heating the off-gas stream to a temperature in the range from 430 to 650° C. in a regenerative heat exchanger and/or a heater;

(iii) decomposing the nitrous oxide contained in the off-gas stream into nitrogen and oxygen in a fixed bed reactor of the $N_2O$ decomposition unit at a temperature in the range from 430 to 800° C. to obtain a purified gas;

(iv) optionally recycling a part of the purified gas into the $N_2O$ decomposition unit (9);

wherein controlling the $N_2O$ decomposition unit using a nonlinear model predictive control which is based on a reactor model of the fixed bed reactor based on equations of energy transport and species transport for nitrogen, oxygen and $N_2O$, the nonlinear model predictive control comprises:

(a) measuring a bed inlet temperature, a bed inlet volume flow, a bed outlet temperature, temperatures along the fixed bed, inlet concentrations of the off-gas stream fed into the $N_2O$ decomposition unit, and outlet concentrations of the purified gas as parameters for the model;

(b) calculating bed activity using an extended Kalman-Filter;

(c) calculating an optimum inlet temperature and optionally a recycle flow as function of time by a nonlinear model predictive control based on the reactor model for a given horizon in time and using calculated values for a given time step of optimum inlet temperature and optimum recycle flow as reference variable for control, wherein (c1) a degree of bypass of the regenerative heat exchanger and/or heating power of the heater and the rotational speed of a recycle blower and/or degree of internal recirculation of the recycle blower are adapted as actors of conventional PID-control of bed inlet temperature and recycle flow, and the nonlinear model predictive control based on the reactor model proposes only the optimum inlet temperature and recycle flow;

or (c2) calculating an optimum degree of bypass of the regenerative heat exchanger and/or heating power of the heater and the rotational speed of a recycle blower and/or degree of internal recirculation of the recycle blower as function of time by using the reactor model for given horizon in time and adapting the degree of bypass of the regenerative heat exchanger and/or heating power and optionally the rotational speed of a recycle blower and/or degree of internal recirculation of the recycle blower as direct actors of the nonlinear model predictive control based on the reactor model;

(d) shifting horizon in time with a given time step;

(e) repeating steps (a) to (d).

2. The process according to claim 1, wherein the nonlinear model predictive control has the target for optimization that a time-integrated $N_2O$-emission rate during prediction horizon is minimized.

3. The process according to claim 1, wherein the $N_2O$-outlet concentration is as close as possible equal to a set-point of the control.

4. The process according to claim 1, wherein the value for the recycle flow (iv) is ≥0 and ≤a maximum capacity of the recycle blower, the gas inlet temperature into the fixed bed reactor is ≤a set-point of safety circuit minus an offset and the bed temperature and the bed outlet temperature are ≤the set-point of safety circuit minus an offset and the bed temperature and the bed outlet temperature ≤the start temperature of catalyst sintering and deactivation, wherein the set-points of the safety circuits result from design limits of the $N_2O$ decomposition unit.

5. The process according to claim 4, wherein the offset is in a range from 3 to 100 K.

6. The process according to claim 1, wherein the off-gas stream is heated at least partly in the regenerative heat exchanger by heat transfer from the purified gas.

7. The process according to claim 1, wherein the off-gas stream fed into the $N_2O$ decomposition unit comprises 200 to 5000 Vol-ppm $NO_x$, 0.5 to 5 Vol-% $CO_2$, 2 to 12 Vol-% $O_2$, 0 to 0.3 Vol-% CO, 3 to 25 Vol-% $N_2O$ and 0.2 to 0.8 Vol-% Ar.

8. The process according to claim 1, wherein the purified gas is passed through a DeNox unit for reducing the amount of $NO_x$.

9. The process according to claim 1, wherein nitrous oxide is absorbed from the off-gas stream in water by pressure absorption before the off-gas stream is fed into the $N_2O$ decomposition unit.

10. The process according to claim 1, wherein nitrogen oxides contained in the off-gas stream are removed by pressure absorption in water before feeding the off-gas stream into the $N_2O$ decomposition unit.

11. The process according to claim 1, wherein the part of the purified gas is recycled into the $N_2O$ decomposition unit if the $N_2O$ concentration in the off-gas stream fed into the $N_2O$ decomposition unit is above 11 wt-%.

* * * * *